United States Patent
Tsukamoto et al.

(10) Patent No.: US 8,023,605 B2
(45) Date of Patent: Sep. 20, 2011

(54) OVERSAMPLING CIRCUIT AND OVERSAMPLING METHOD

(75) Inventors: Nobunari Tsukamoto, Kanagawa (JP); Hidetoshi Ema, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 893 days.

(21) Appl. No.: 11/845,416

(22) Filed: Aug. 27, 2007

(65) Prior Publication Data

US 2008/0056420 A1 Mar. 6, 2008

(30) Foreign Application Priority Data

Sep. 5, 2006 (JP) .................. 2006-240668

(51) Int. Cl.
*H04L 7/00* (2006.01)
(52) U.S. Cl. ........ 375/355; 375/354; 375/371; 375/375; 375/376; 327/1; 327/141; 370/503
(58) Field of Classification Search .................. 375/355, 375/354, 371, 375, 376; 327/1, 141; 370/503
See application file for complete search history.

(56) References Cited

U.S. PATENT DOCUMENTS

| | | | |
|---|---|---|---|
| 5,003,562 A | 3/1991 | van Driest et al. | |
| 6,122,335 A | 9/2000 | Colella et al. | |
| 2004/0258410 A1 | 12/2004 | Yajima et al. | |
| 2005/0265440 A1* | 12/2005 | Sohn | 375/233 |
| 2006/0109942 A1 | 5/2006 | Vallet | |

FOREIGN PATENT DOCUMENTS

| | | |
|---|---|---|
| EP | 1 538 775 A1 | 6/2005 |
| JP | 3414700 | 4/2003 |
| JP | 3636657 | 1/2005 |
| JP | 2005-192192 | 7/2005 |

* cited by examiner

*Primary Examiner* — Dac Ha
*Assistant Examiner* — Zewdu Kassa
(74) *Attorney, Agent, or Firm* — Oblon, Spivak, McClelland, Maier & Neustadt, L.L.P.

(57) ABSTRACT

A multiphase delay unit causes different delay times to a reference clock to generate a multiphase clock with different phases. A multiphase sampling unit samples the input signal using the multiphase clock, and outputs multiphase sampling data. A phase selecting unit detects a phase relation of the multiphase clock using the multiphase sampling data, and selects output data from the multiphase sampling data based on a result of detecting the phase relation.

3 Claims, 23 Drawing Sheets

OVERSAMPLING CIRCUIT AND OVERSAMPLING METHOD

CROSS-REFERENCE TO RELATED APPLICATIONS

The present application claims priority to and incorporates by reference the entire contents of Japanese priority document, 2006-240668 filed in Japan on Sep. 5, 2006.

BACKGROUND OF THE INVENTION

1. Field of the Invention

The present invention relates to an oversampling circuit and an oversampling method that are used for a receiver, etc., capable of high-speed serial communication, such as Serial-ATA and PCI Express.

2. Description of the Related Art

A demand for large-capacity and high-speed data transmission between devices, boards, and chips has been increasing recently. To meet the demand, a so-called high-speed serial transmission method has been adopted more frequently as a transmission interface standard. According to the method, a clock having the same frequency as that of transmission data is embedded in the transmission data (embedded clock), and the clock is extracted from the data received at a data receiving unit to recover the received data on the basis of the extracted clock. A circuit carrying out recovery of the clock and data is called a clock data recovery circuit (CDR circuit), which is usually provided as a PLL (Phase Locked Loop) circuit. The PLL circuit makes control to synchronize an inner clock generated by a VCO (Voltage Control Oscillator) included in the PLL circuit with the phase of a received signal.

Nowadays, however, high-speed serial transmission pushes faster clock frequencies, leading to a demand for a clock frequency of several GHz. This invites such problems as increasing chip size in a PLL circuit, greater power consumption, raising cots, more complicated circuit design and layout, etc. In addition, the higher a clock frequency becomes, the smaller a PLL jitter tolerance. This brings the necessity that a clock used for data reception must synchronize with input data at an extremely precise level, which is very difficult work to do.

An oversampling type clock data recovery circuit has been suggested as a solution to the above problem, and is now in popular use. This clock data recovery circuit generates multiphase clock signals out of a reference clock by shifting the phase of the reference clock at equal intervals, samples input data at respective phases to obtain a bit string to detect timing of logic inversion from the bit string, and reproduces the clock and data on the basis of a detection result. This allows a circuit configuration dominantly composed of digital circuits except a multiphase clock generating unit, which circuit configuration is easy to achieve.

The multiphase clocks used in the above circuit configuration, however, pose a problem of phase differences between generated clocks. If the phase differences are not equal intervals, the recovered clock comes to have a shorter cycle, which could cause malfunction if worst comes to worst.

To solve such a problem, the inventor has suggested a data recovery method and a data recovery circuit.

According to the data recovery method and data recovery circuit, a clock included in input data is not recovered, but oversampling of the input data is carried out using multiphase clocks that have frequencies equal to or lower than the frequency of the clock and that are independent of the input signal, and the input data is recovered exactly by using the result of oversampling (e.g., see Japanese Patent Application Laid-Open No. 2005-192192).

The above method, however, is carried out on the assumption that the phase differences between the multiphase clocks are equal intervals. If the phase differences are not equal intervals, a resulting error gives an observation of an increase in the jitter of a reception signal, leading to the deterioration of reception characteristics.

Usually, a PLL circuit or a DLL (Delay Lock Loop) circuit is used to generate the phases of multiphase clocks necessary for oversampling. Both circuits are provided as a circuit constructed by connecting buffers circularly, such as a multiphase clock circuit shown in FIG. 31.

The circuit shown in FIG. 31 represents a case where four-phase clocks are generated using two differential amplifiers 51a and 51b, in which case the number of buffer stages and the overall configuration vary properly according to the number of clock phases required. In FIG. 31, generated multiphase clocks are denoted by CLK0 to CLK3. In generating the multiphase clocks, the circuits of the differential amplifiers 51a and 51b and load capacitances attached to wiring. etc., are designed to be identical so that every risetime and falltime of the clocks becomes identical at the differential amplifiers 51a and 51b, respectively.

In actual operation, however, devices mounted on the same chip show locally dispersed characteristics, and load capacities attached to wiring vary depending on the surrounding circuit, so that making phases completely uniform is difficult. Besides, as a frequency gets higher, an allowable error between the phases of multiphase clocks gets smaller, which increases current required by the differential amplifiers 51a and 51b used for clock generation, leading to a tendency of an increase in switching current. As a result, power voltage for the differential amplifiers fluctuates locally, thus the characteristics of each buffer stage fluctuate variously.

An effective means for knowing power fluctuation at a design stage is yet to be established. Reducing the phase dispersion between multiphase clocks to a size within a desirable error, therefore, is extremely difficult. When the risetimes and falltimes of respective clocks are uniform, multiphase clocks with phase differences of equal intervals can be generated, as shown in a timing chart shown in FIG. 32A. When the characteristics of respective buffers are dispersed as described above, however, the phase differences between the multiphase clocks are not formed as the equal interval.

To solve this problem, a clock and data recovery circuit and a clock control method for the same have been suggested (e.g., see Japanese Patent No. 3636657). According to this circuit and method, phase interpolators are used at a multiphase clock generating unit to carry out phase adjustment.

A phase adjusting circuit of Japanese Patent No. 3636657, however, puts out clocks having phases internally divided by the interpolators on the basis of multiphase clocks originally having phase differences of equal interval. When the phases of the original multiphase clocks are shifted, therefore, the phase adjustment does not have any significance. Besides, the interpolators are used in the number same as that of the phases of the clocks, and these interpolators show different delay times due to variations in device characteristics, local power voltage fluctuation, etc. Achieving completely identical phases, therefore, is difficult.

A phase shift quantity detecting circuit for multiphase clocks and a bit synchronous circuit using the phase shift quantity detecting circuit have been suggested (e.g., see Japanese Patent No. 3414700). According to the phase shift quantity detecting circuit and the bit synchronous circuit, multiphase clocks having phase differences of virtually equal intervals are generated on the basis of a reference clock, and each of the multiphase clocks is sampled using the reference clock to detect a phase shift quantity so that the phase shift quantity (delay quantity) of the multiphase clocks is corrected into a proper value.

The phase shift quantity detecting circuit of Japanese Patent No. 3414700 is provided on the assumption that a plurality of delay circuits incorporated in the detecting circuit has virtually equal delay characteristics. For the reason as described above, however, delay characteristics are dispersed, which brings difficulty in generating multiphase clocks having phase differences of equal intervals. Besides, the phase shift quantity detecting circuit compares edges of a clock with that of another clock. This makes exact detection of phases difficult as clock frequencies get higher.

SUMMARY OF THE INVENTION

It is an object of the present invention to at least partially solve the problems in the conventional technology.

According to an aspect of the present invention, there is provided an oversampling circuit including a multiphase delay unit that causes different delay times to a reference clock to generate a multiphase clock with different phases; a multiphase sampling unit that samples an input signal using the multiphase clock, and outputs multiphase sampling data; and a phase selecting unit that detects a phase relation of the multiphase clock using the multiphase sampling data, and selects output data from the multiphase sampling data based on a result of detecting the phase relation.

Furthermore, according to another aspect of the present invention, there is provided an oversampling circuit including a multiphase delay control unit that causes different delay times to a reference clock to generate a multiphase clock with different phases, where the delay time being controlled by a phase control signal; a multiphase sampling unit that samples an input signal using the multiphase clock, and outputs multiphase sampling data; and a phase detecting unit that detects a phase relation of the multiphase clock using the multiphase sampling data, and generates the phase control signal for the multiphase clock.

Moreover, according to still another aspect of the present invention, there is provided an oversampling circuit including a multiphase delay unit that causes different delay times to an input signal to generate multiphase data with different phases; a multiphase sampling unit that samples the multiphase data using a reference clock, and outputs multiphase sampling data; and a phase selecting unit that detects a phase relation of the multiphase data using the multiphase sampling data, and selects output data from the multiphase sampling data based a result of detecting the phase relation.

Furthermore, according to still another aspect of the present invention, there is provided an oversampling circuit including a multiphase delay control unit that causes different delay times to an input signal to generate multiphase data with different phases, the delay time being controlled by a phase control signal; a multiphase sampling unit that samples the multiphase data using a reference clock, and outputs multiphase sampling data; and a phase detecting unit that detects a phase relation of the multiphase data using the multiphase sampling data, and generates the phase control signal for the multiphase data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
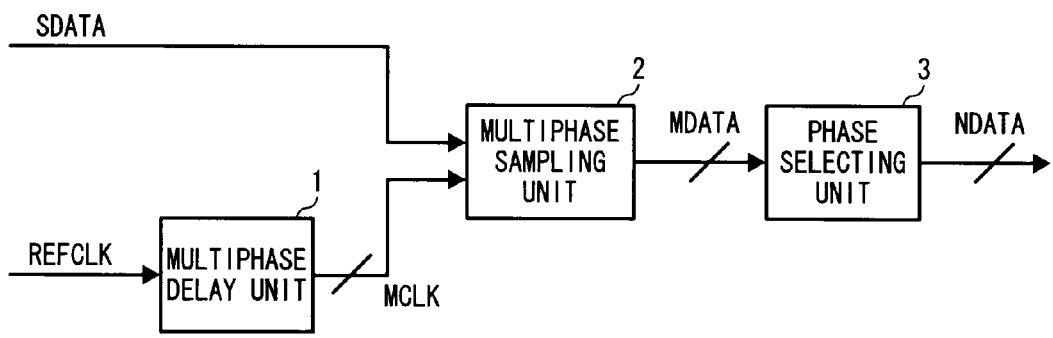
FIG. 1 depicts the overall configuration of an oversampling circuit according a first embodiment of the present invention.

FIG. 1 depicts the overall configuration of an oversampling circuit according to a first embodiment of the present invention. In the oversampling circuit shown in FIG. 1, a reference clock REFCLK is put into a multiphase delay unit 1, and is put out as M bit multiphase clocks MCLK having phases different from each other. The reference clock REFCLK is acceptable when generated by an ordinary PLL circuit, etc., which is a known technique, and therefore will not be described in detail.

External input serial data SDATA is sampled at a multiphase sampling unit 2, using each of the multiphase clocks MCLK, and is put out as M bit multiphase data MDATA. A phase selecting unit 3 selects a proper data out of the multiphase data MDATA, and puts out the selected data as N bit over sample data NDATA. In this process, M>N must be satisfied.

Figure 2:
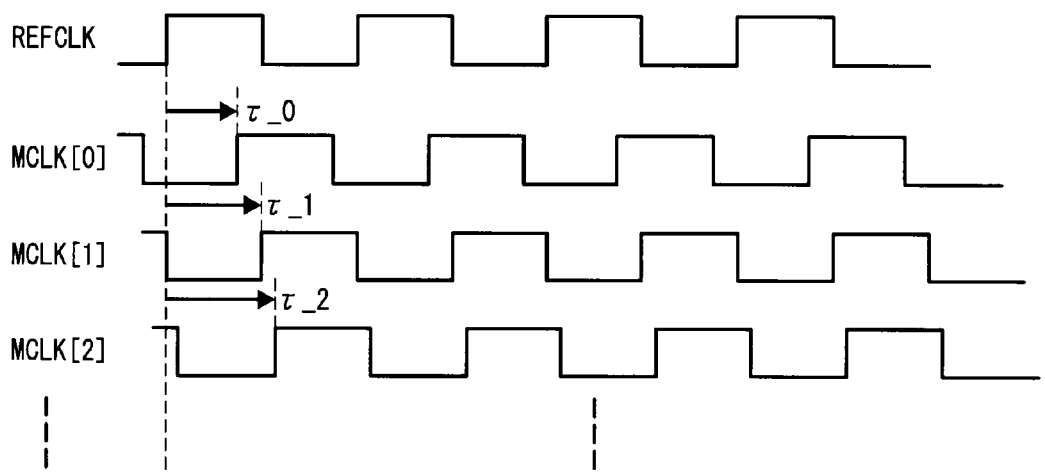
FIG. 2 depicts an example of a timing chart of input/output signals at a multiphase delay unit incorporated in the oversampling circuit shown in FIG. 1.

FIG. 2 depicts an example of a timing chart of input/output signals at the multiphase delay unit 1 incorporated in the oversampling circuit shown in FIG. 1.

In FIG. 2, MCLK[k] denotes kth bit of the multiphase clocks MCLK, and the same notational convention will be adopted appropriately in the following description.

The M bit multiphase clocks MCLK are put out in delay at respective delay times $\tau\_0$ to $\tau\_(M-1)$ relative to the input reference clock REFCLK, which delay times are different from each other. $\tau\_0$ represents the delay time from a rising edge of the reference clock REFCLK to a rising edge of the multiphase clock MCLK[0], and the same notational convention will be used in the description to follow.

Desirably, the delay times $\tau\_0$ to $\tau\_(M-1)$ are equal in terms of interval to some extent, but are not required to be strictly equal. However, $\tau\_(M-1)-\tau\_0>T$ must be satisfied when the cycle of the reference clock REFCLK is T.

Figure 3:
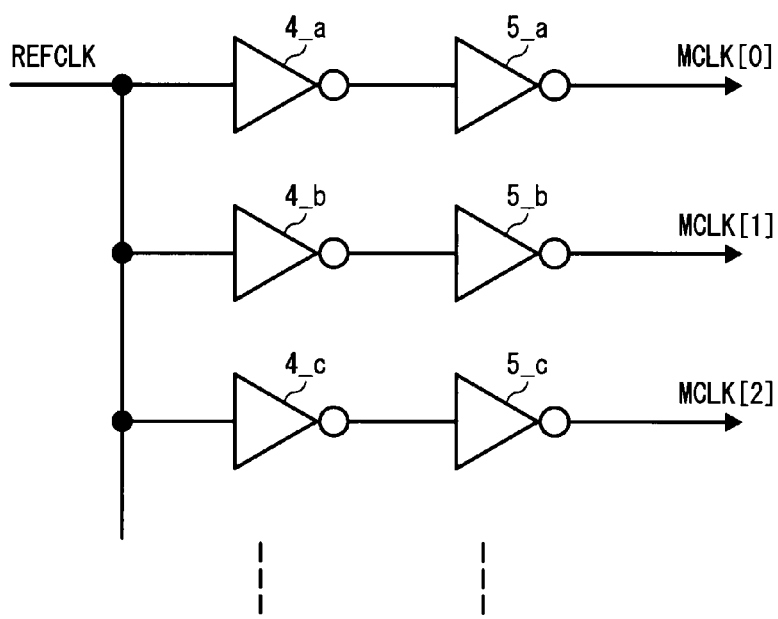
FIG. 3 depicts one embodiment of the multiphase delay unit incorporated in the oversampling circuit shown in FIG. 1.

FIG. 3 depicts one embodiment of the multiphase delay unit 1 incorporated in the oversampling circuit shown in FIG. 1.

The following embodiments will be described on the assumption of M=14, but a proper value for M must be chosen according to a required specification in actual application of the oversampling circuit. The input reference clock REFCLK is put in parallel into M units of inverters 4_a to 4_n, which send their output further to M units of inverters 5_a to 5_n, which then put out the M bit multiphase clocks MCLK.

According to the embodiment shown in FIG. 3, the inverters 5_a to 5_n are all identical in size, but the inverters 4_a to 4_n are different from each other in size (drive capability).

Generally, the risetimes and falltimes of a signal driven by an inverter are determined by the size of inverter driving the signal and a load capacitance attached to the output node of the inverter. In the embodiment shown in FIG. 3, therefore, gradually changing the size of the inverters 4_a to 4_n to gradually shift the phases of clocks put out of the inverters to be able to generate the M bit multiphase clocks MCLK as shown in FIG. 2.

Figure 4:
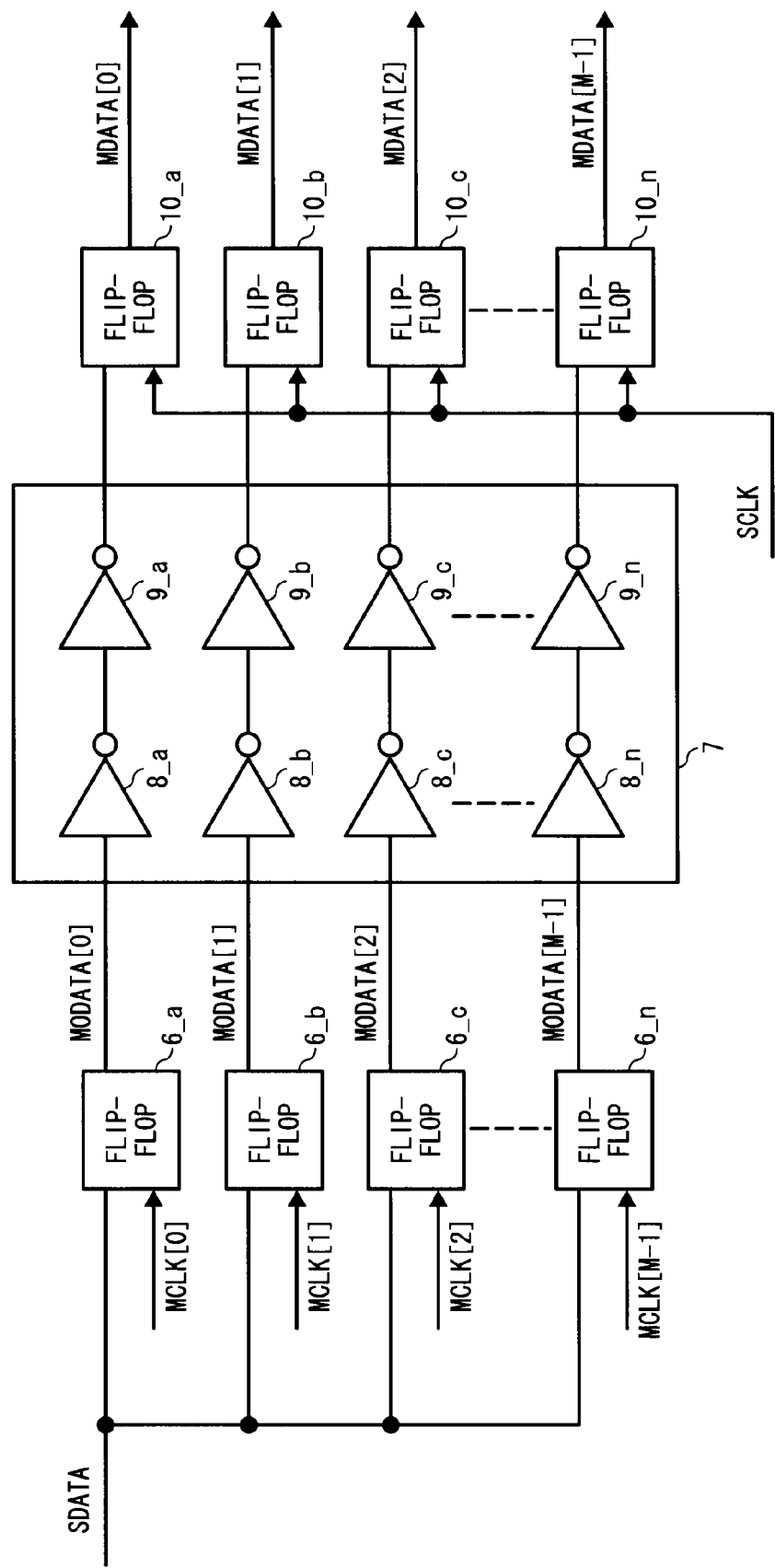
FIG. 4 depicts one embodiment of a multiphase sampling unit incorporated in the oversampling circuit shown in FIG. 1.

FIG. 4 depicts one embodiment of the multiphase sampling unit 2 incorporated in the oversampling circuit shown in FIG. 1.

The external input serial data SDATA is put into M units of flip-flops 6a to 6n, where the input data is sampled at rising edges of the M bit multiphase clocks MCLK generated by the multiphase delay unit 1, respectively. Sampled M bit data MODATA are then delayed for proper delay times at a delay unit 7, and are sampled again through M units of flip-flops 10_a to 10_n, respectively, at which a sampling clock SCLK common to every pieces of data is used. This sampling clock SCLK is generated by properly delaying the reference clock REFCLK or one of the multiphase clocks MCLK.

Thus, every sampled M bit multiphase data MDATA is put out in synchronization with the sampling clock SCLK. The delay unit 7 has the internal configuration same as that shown in FIG. 3, being composed of inverters 8_a to 8_n and 9_a to 9_n.

When a delay time for M bit data MODATA[k] at the delay unit 7 is $\tau'\_k$, a total delay time $\tau tot\_k=\tau\_k+\tau'\_k$ including a clock delay time $\tau\_k$ at the multiphase delay unit 1 should desirably be constant regardless of the value of k in order to take in every data at the flip-flops 10_a to 10_n using the sampling clock SCLK. The size of the inverters 8_a to 8_n and 9_a to 9_n, therefore, is so selected as to ensure the constant total delay time $\tau tot\_k=\tau\_k+\tau'\_k$.

The dispersion of the total delay time $\tau tot\_k$ to some extent, however, raises no problem if the set-up and hold time of the flip-flops 10_a to 10_n is within an allowable range.

Figure 5:
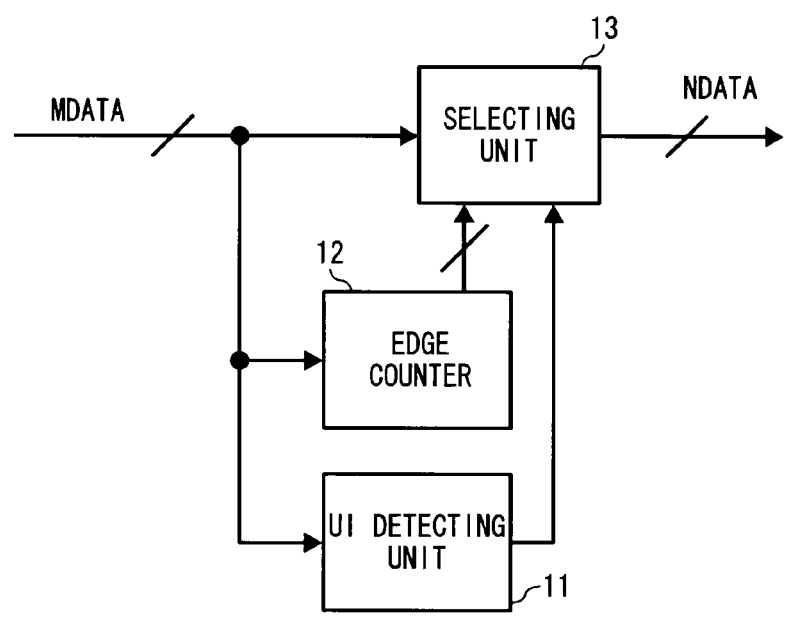
FIG. 5 depicts one embodiment of a phase selecting unit incorporated in the oversampling circuit shown in FIG. 1.

FIG. 5 depicts one embodiment of the phase selecting unit 3 incorporated in the oversampling circuit shown in FIG. 1.

The incoming M bit multiphase data MDATA is put into a UI (Unit Interval: 1 bit data length) detecting unit 11, an edge counter 12, and a selecting unit 13. The UI detecting unit 11 detects L that gives a delay time at the multiphase delay unit 1 of $\tau\_L-\tau\_0=T$, using the input M bit multiphase data MDATA, and puts out the detected L as a UI detection result to the selecting unit 13.

T denotes the cycle of the reference clock REFCLK. The edge counter 12 detects data transition (edge) present before kth bit of the M bit multiphase data MDATA, and counts an increment of a count value count_k upon detecting an edge. The edge counter 12 counts edges for every k satisfying 0<k<M (or 0<k<L). The selecting unit 13 selects a proper N bit data on the basis of a UI detection result and count values count_1 to count_(M−1), and puts out the selected data as the N bit over sample data NDATA.

Figure 6:
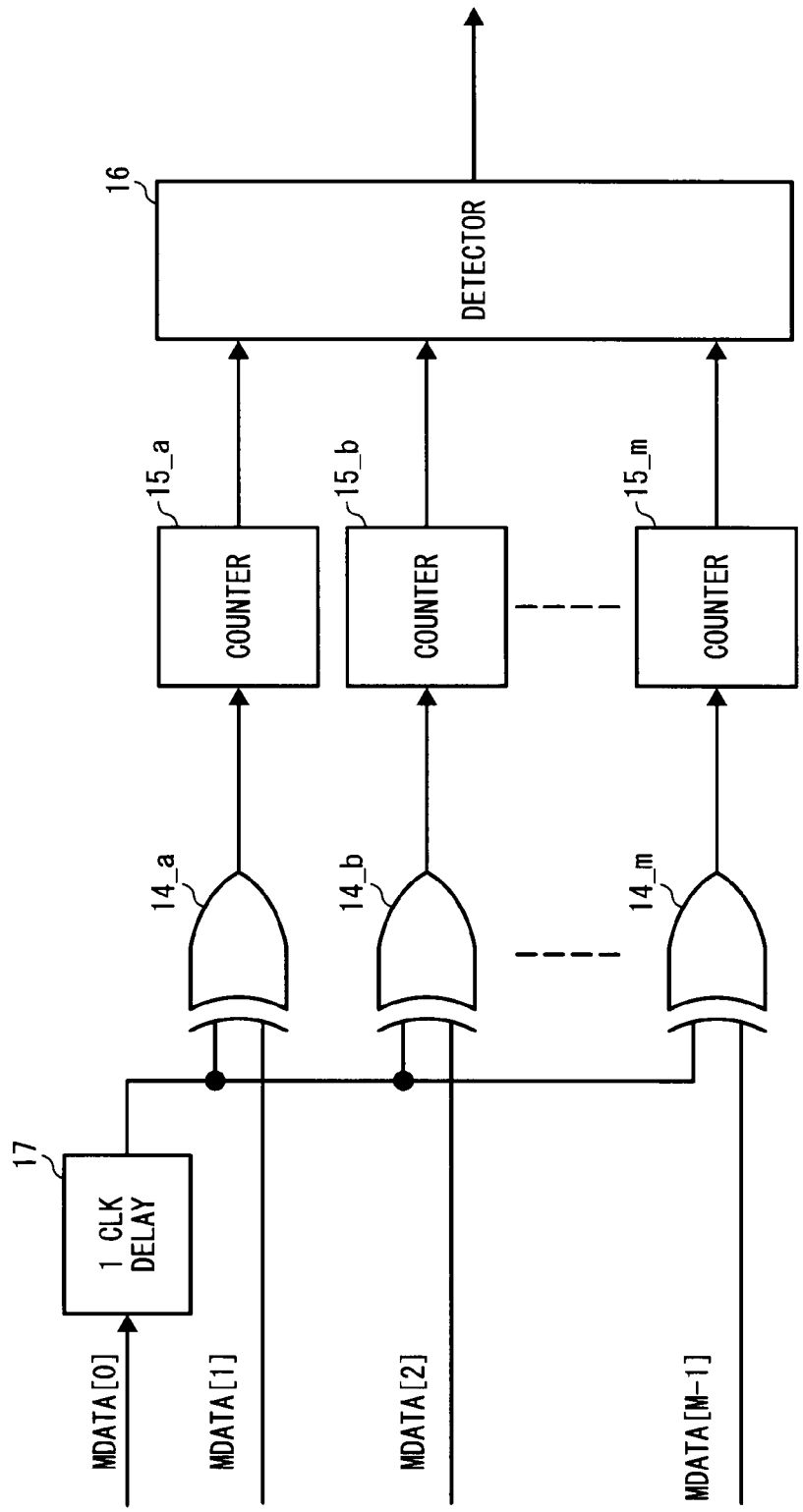
FIG. 6 depicts one embodiment of a UI detecting unit incorporated in the phase selecting unit shown in FIG. 5.

FIG. 6 depicts one embodiment of the UI detecting unit 11 incorporated in the phase selecting unit shown in FIG. 5.

Data obtained by delaying M bit data MDATA[0] by one clock cycle and M bit data MDATA[k] are put into each of (M−1) units of XOR gates (exclusive-OR gate) 14_a to 14_m, at which the range of k is k=1, 2, - - - (M−1) at maximum. Output from the XOR gates 14_a to 14_m is put into (M−1) units of counters 15_a to 15_m, which count the number of times of "H" registered by the output from the XOR gates 14_a to 14_m, and put out resulting count values. A detector 16 detects the minimum count value out of the count values put out of respective counters 15_a to 15_m, and puts out the detected minimum count value. If a time difference equivalent to 1 clock cycle (1 UI) exists between the multiphase clock MCLK[0] and the multiphase clock MCLK[L], the M bit data MDATA[0] and M bit data MDATA [L] becomes constantly identical, thus output from the XOR gate becomes constantly zero. This leads to a conclusion that the minimum output value from the 15_a to 15_m represents the M bit data closest in phase.

While the condition k=1, 2, - - - (M−1) is given in the above embodiment, the range of k can be narrowed in a permissible extent.

Figure 7:
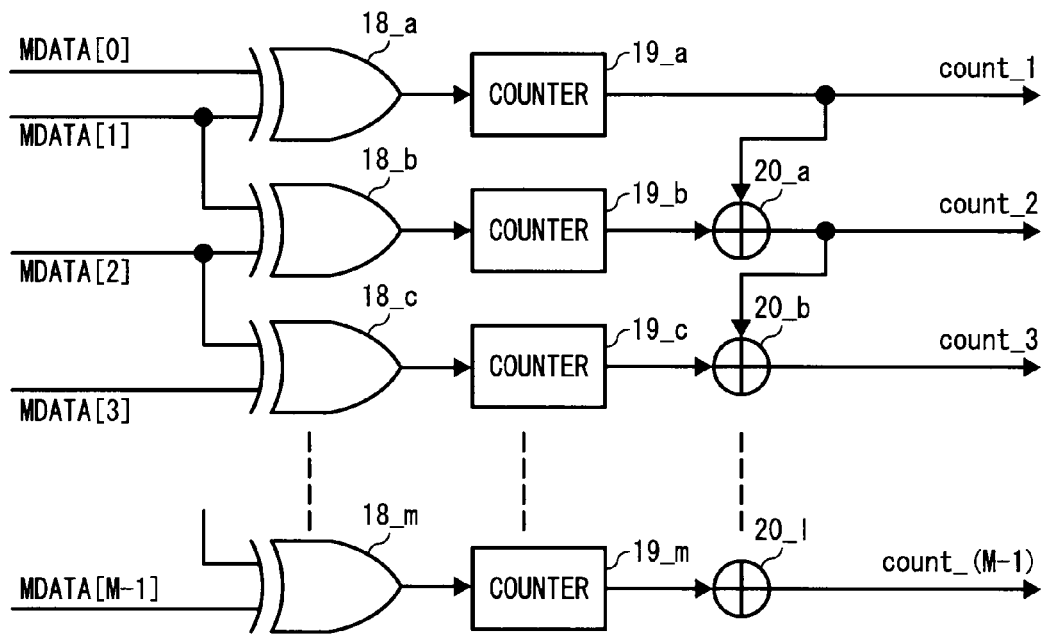
FIG. 7 depicts one embodiment of an edge counter incorporated in the phase selecting unit shown in FIG. 5.

FIG. 7 depicts one embodiment of the edge counter 12 incorporated in the phase selecting unit shown in FIG. 5.

Incoming M bit multiphase data MDATA is put into XOR gates 18_a to 18_m in such a way that each pair of data adjacent in phase is put into each of the XOR gates. Output from the XOR gates 18_a to 18_m is put into counters 19_a to 19_m, and output from the counters 19_a to 19_m is then put into adders 20_a to 20_l, which calculate the sum of each input from the counters. Thus, the total numbers of edges before respective bits of the M bit multiphase data MDATA are counted, and are put out as count values count_1 to count_ (M−1).

The detailed operation of the selecting unit 13 will then be described.

Figure 8:
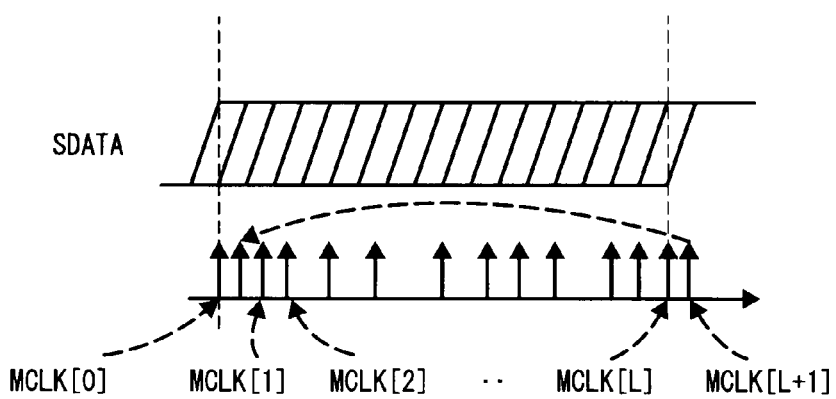
FIG. 8 depicts an example of times of rising edges of multiphase clocks MCLK[k] defined by respective values of k, which times are represented by arrows on the horizontal axis, with regard to a reference of a rising edge of a multiphase clock MCLK[0] at the selecting unit shown in FIG. 5.

FIG. 8 depicts an example of times of rising edges of multiphase clocks MCLK[k] defined by respective values of k, which times are represented by arrows on the horizontal axis, with regard to a reference of a rising edge of the multiphase clock MCLK[0] at the selecting unit shown in FIG. 5.

Usual multiphase clocks should preferably have equal inter-phase intervals, but the inter-phase intervals are not equal in actual application, as shown in FIG. 8, because of layout-based variations in load capacitances and power fluctuation, functional dispersion of devices, etc.

Suppose a situation where the reception side and the transmission side operate at different reference clocks, respectively. This sort of situation could occur on an ordinary basis. In such a situation, the reference clock REFCLK does not synchronize with external input data SDATA. This leads to an assumption that the edges of the input data SDATA are distributed uniformly in the section from MCLK[0] to MCLK [L] on the number line shown in FIG. 8. When the probability density of this distribution is $\phi$, a count value count_k is given by the following equation:

$$count\_k = \phi \times (\tau\_k - \tau\_0)$$

The equation means that the count value count_k represents a time difference between the multiphase clock MCLK [k] and the multiphase clock MCLK[0]. At this time, the time of 1 UI is given by count_L when L detected by the UI detecting unit 11 is used. When L_a that satisfies count_ (L_a)/count_L=a/N (a=0, 1, ... N−1) is detected, therefore, a clock equivalent to 1/N of the reference clock REFCLK can be obtained.

Figure 9:
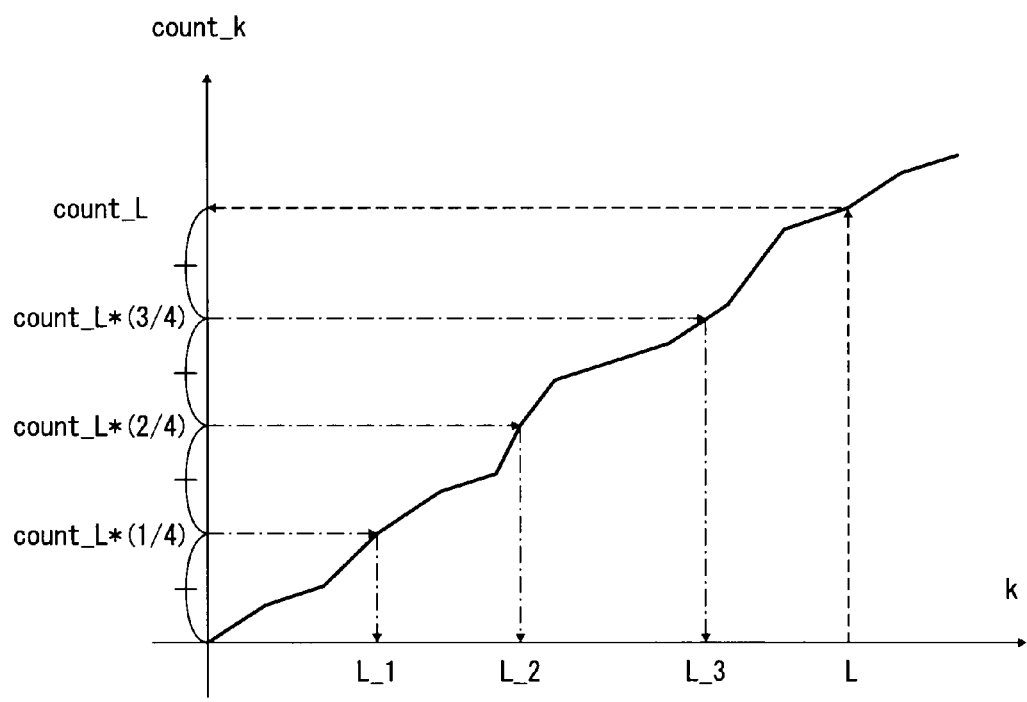
FIG. 9 depicts an example of the relation between k and a count value count_k.

FIG. 9 depicts an example of the relation between k and the count value count_k, in which relation an oversampling bit number N=4 is satisfied.

As shown in FIG. 9, the count value count_k is a monotonic increasing function with respect to k, which enables detection of a proper L_a. As described above, a delay time at the multiphase delay unit 1 changes dynamically due to the fluctuation of power voltage and temperature. For this reason, a clock at a desired phase can be selected constantly by carrying out the above phase detection constantly or at every a given time interval, or by monitoring the fluctuation of power voltage and temperature and carrying out phase detection when the fluctuation reaches a certain amount.

Which way to use to carry out detection can be selected properly according to effectiveness in practical use. As described above, when the count value count_k represents a time difference between M bit multiphase clocks, the edges of the input data SDATA must be distributed uniformly at the given probability density $\phi$ relative to the multiphase clock MCLK[0].

To satisfy this condition, counting operation must be carried out for a given time T0 or longer. When the clock frequency of the input data SDATA is Ftx and the frequency of the reference clock REFCLK is Frx, the time T0 must satisfies at least the condition:

$$T0 > 1/|Ftx - Frx|$$

Figure 10:
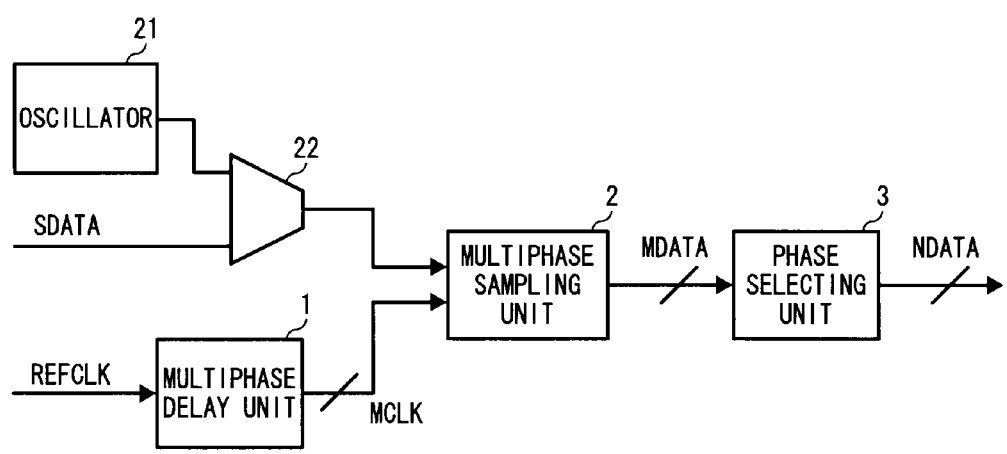
FIG. 10 depicts an example of a receiver using the oversampling circuit shown in FIG. 1.

When the transmission side and the reception side are not completely asynchronous with each other for such a reason as operation at the same reference clock, a receiver having a configuration shown in FIG. 10 is used preferably. This receiver is provided by adding an oscillator 21 and a selector 22 to the oversampling circuit of the embodiment shown in FIG. 1. The oscillator 21 is completely asynchronous with the reference clock REFCLK, and oscillates at a proper frequency F1.

In normal operation, the selector 22 puts the serial data SDATA into the multiphase sampling unit 2, in which case the phase selecting unit 3 selects a given phase.

When input data is not needed, such as a time of circuit startup or an idle state in input reception, the selector 22 sends output from the oscillator 21 into the multiphase sampling unit 2, in which case the phase selecting unit 3 carries out calibration operation of executing the above counting operation to determine a phase L_a to select.

A delay time given by the multiphase delay unit 1 changes dynamically, as described above, so that the calibration operation is carried out properly according to a need. If the frequency F1 of the oscillator 21 is approximately the same as the frequency Frx of the reference clock REFCLK, the counting time T0 must satisfy at least the condition:

$$T0 > 1/|F1 - Frx|$$

If the frequency F1 of the oscillator 21 is low enough to be one pth of the frequency Frx, the counting time T0 must satisfy the condition:

$$T0 > p/|F1 - Frx|$$

In addition, a delay time given by the multiphase delay unit 1 changes due to a layout-based parasitic capacitance, local fluctuation of power voltage caused by switching current, etc., thus often does not follow a designer's intention, which may even cause phase reversal in the multiphase clocks MCLK.

Figure 11:
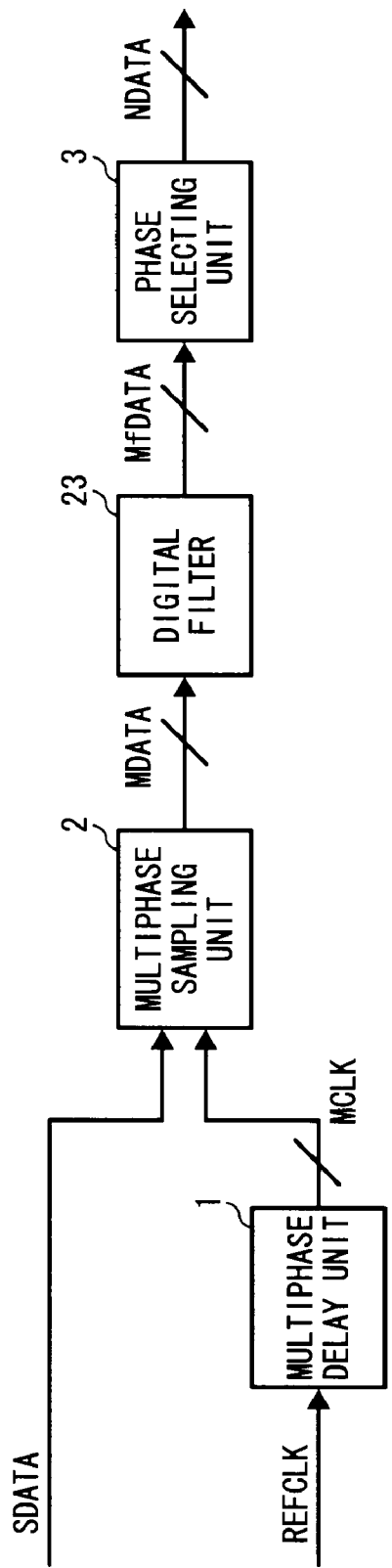
FIG. 11 depicts an example of a receiver using the oversampling circuit shown in FIG. 1.

To solve such a problem, a receiver having a configuration shown FIG. 11 is used preferably. This receiver is provided by adding a digital filter 23 having proper low-pass characteristics to the oversampling circuit of the embodiment shown in FIG. 1.

Figure 12:
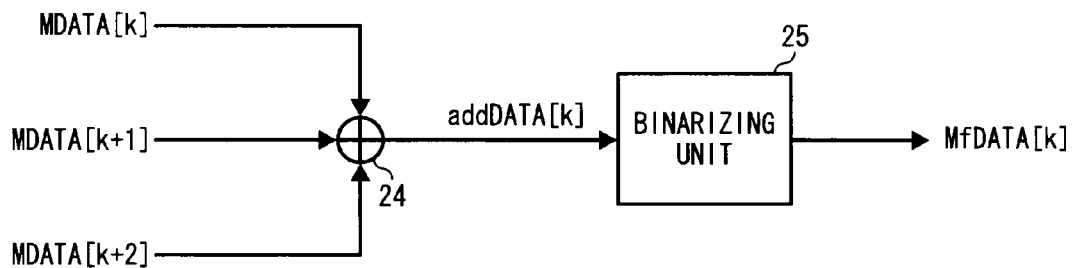
FIG. 12 depicts a part of a filter that is provided when a tertiary FIR filter is employed as a digital filter.
Figure 13:
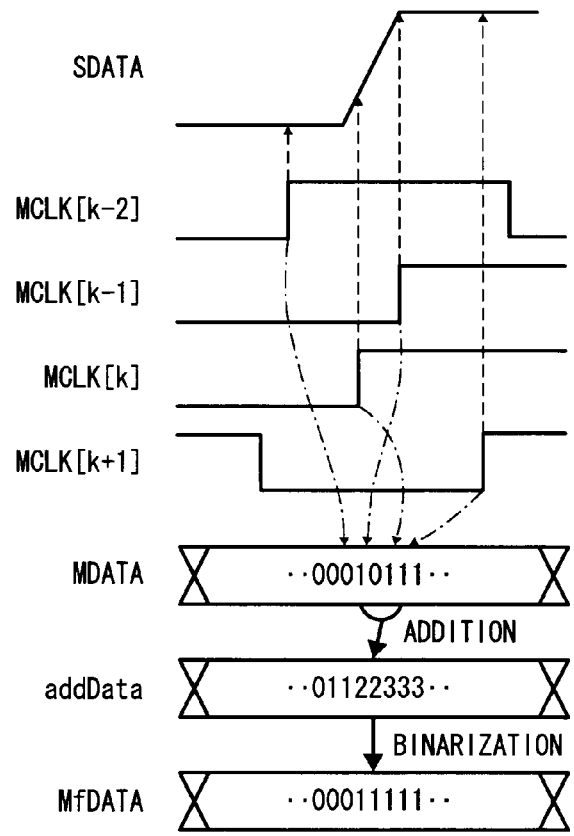
FIG. 13 depicts an operational example of the filter shown in FIG. 12.

The digital filter 23 is provided by using a known FIR (Finite Impulse Response) filter or an IIR (Infinite Impulse Response) filter. A part of a filter that is a tertiary FIR filter provided as the digital filter 23 is shown in FIG. 12, and a detailed operational example of such a filter is shown in FIG. 13. Actually, a filter order and circuit configuration may be selected properly according to a need.

According to the embodiment shown in FIG. 12, the input multiphase data MDATA is added up by an adder 24, and then is binarized using a proper threshold at a binarizing unit 25.

As shown in FIG. 13, when the phases of the multiphase clocks MCLK sampling the edges of serial data are reversed, the sampled multiphase data MDATA is observed as if it were in a state of chattering. When the digital filter 23 is set to have characteristics capable of eliminating the chattering, the selecting unit can be used using the multiphase data MDATA put out of the filter.

The selecting unit 13 uses L_a (a=0, 1, ... N−1) detected in the above manner to so select and put out the N bit over sample data NDATA as to satisfy the condition:

NDATA[a]=MDATA[L_a] (a=0, 1, ... N−1)

As described above, according to the first embodiment, data is taken in using multiphase clocks generated on the basis of one reference clock, the edges of the data pattern are counted to estimate the phase relation of the multiphase clocks, and data taken in at a clock having a proper phase is put out as oversampling data. Through this process, the dispersion of clock phases due to power/temperature fluctuation, functional dispersion of devices, etc., is corrected to be able to carry out precise oversampling of the input data.

Since sampled data is used for phase detection, a detection error can be reduced. The reference clock used for the circuit is acceptable if it has a single phase, and the multiphase clocks are used for sampling immediately after being generated. This eliminates a need of transmitting the multiphase clocks, allowing a smaller circuit scale, thus leading to a reduction in chip size and power consumption.

Figure 14:
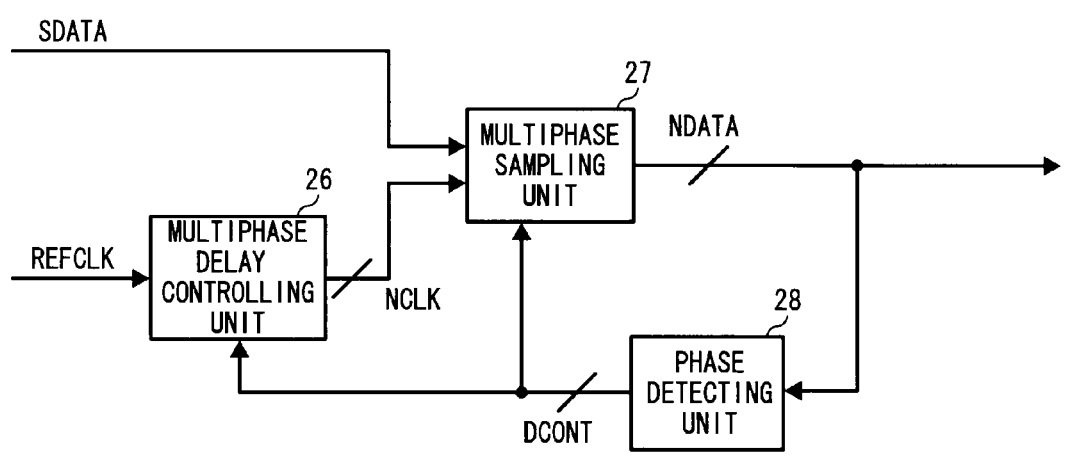
FIG. 14 depicts the overall configuration of an oversampling circuit according a second embodiment of the present invention.

FIG. 14 depicts the overall configuration of an oversampling circuit according to a second embodiment of the present invention.

A multiphase delay control unit 26 delays the reference clock REFCLK, and puts it out as N bit multiphase clocks NCLK. In delaying the reference clock REFCLK, a delay time for each phase is controlled by a delay control signal DCONT. The external input serial data SDATA is sampled using respective multiphase clocks NCLK at a multiphase sampling unit 27, and is put out as the N bit over sample data NDATA. A phase detecting unit 28 detects the phases of the multiphase clocks NCLK on the basis of the over sample data NDATA, and puts out a proper delay control signal DCONT.

Figure 15:
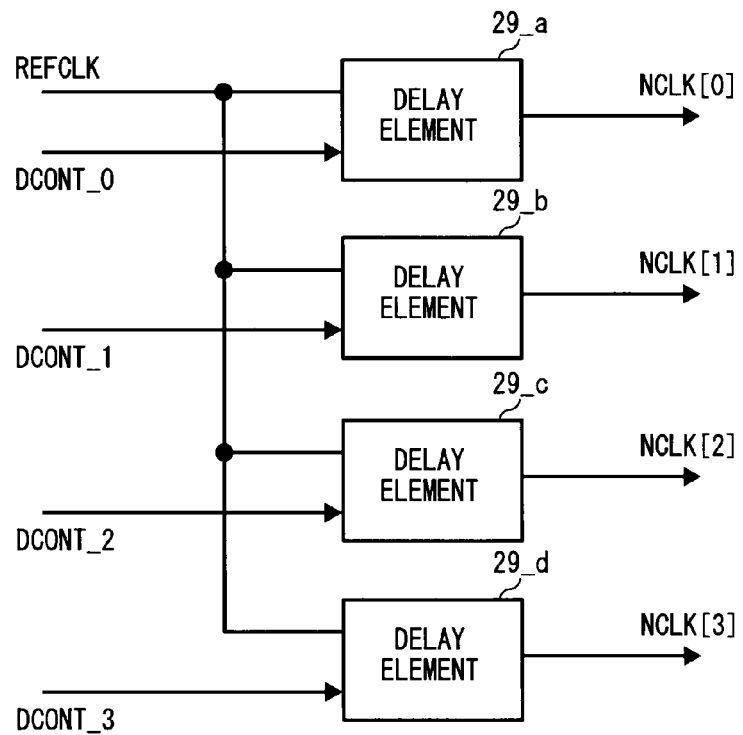
FIG. 15 depicts the detailed configuration of a multiphase delay control unit incorporated in the oversampling circuit shown in FIG. 14.

FIG. 15 depicts the detailed configuration of the multiphase delay control unit 26 incorporated in the oversampling circuit shown in FIG. 14.

The following embodiments will be described on the premise that the oversampling bit number N is 4, but the embodiments offer the same effect also in a case where the oversampling bit number is not 4.

The reference clock REFCLK is put into delay elements 29_a to 29_d, which delay the input reference clock REFCLK for different delay times $\tau\_0$ to $\tau\_(N-1)$ to put out respective N bit multiphase clocks NCLK. The delay times $\tau\_0$ to $\tau\_(N-1)$ are controlled by control signals DCONT_0 to DCONT_(N−1), respectively. Here, DCONT_k means the delay control signal DCONT for the multiphase clock NCLK[k], and the same notational convention will be used in the following description.

Figure 16:
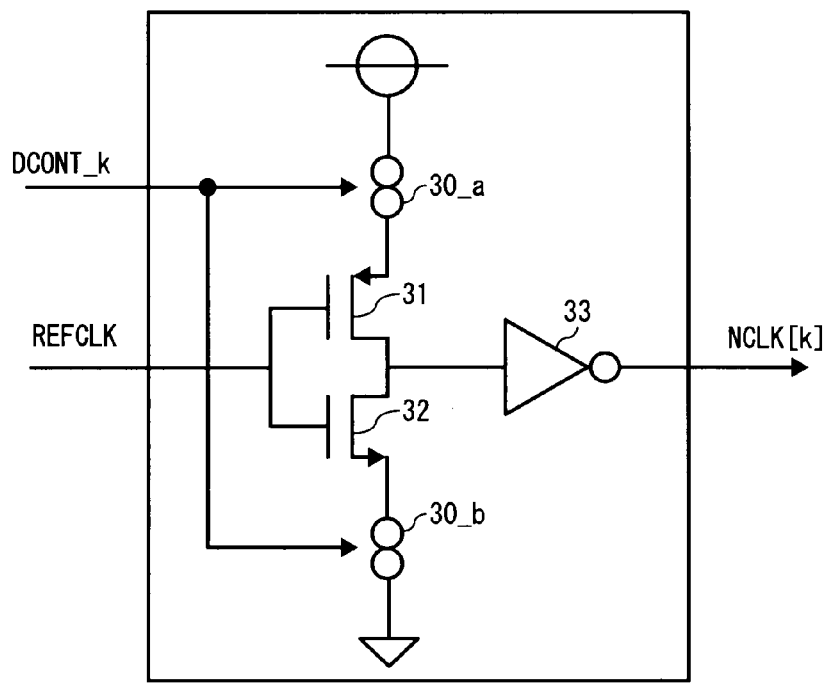
FIG. 16 depicts a configurative example of a delay element incorporated in the multiphase delay control unit shown in FIG. 15.

A configurative example of each of the delay elements 29_a to 29_d is shown in FIG. 16. According to the configuration, the control signal DCONT controls current supply from current sources 30_a and 30_b to control the risetimes and falltimes of a signal driven by a PMOS transistor 31 and a PMOS transistor 32, thus separately controls respective delay times of the delay elements 29_a to 29_d.

Figure 17:
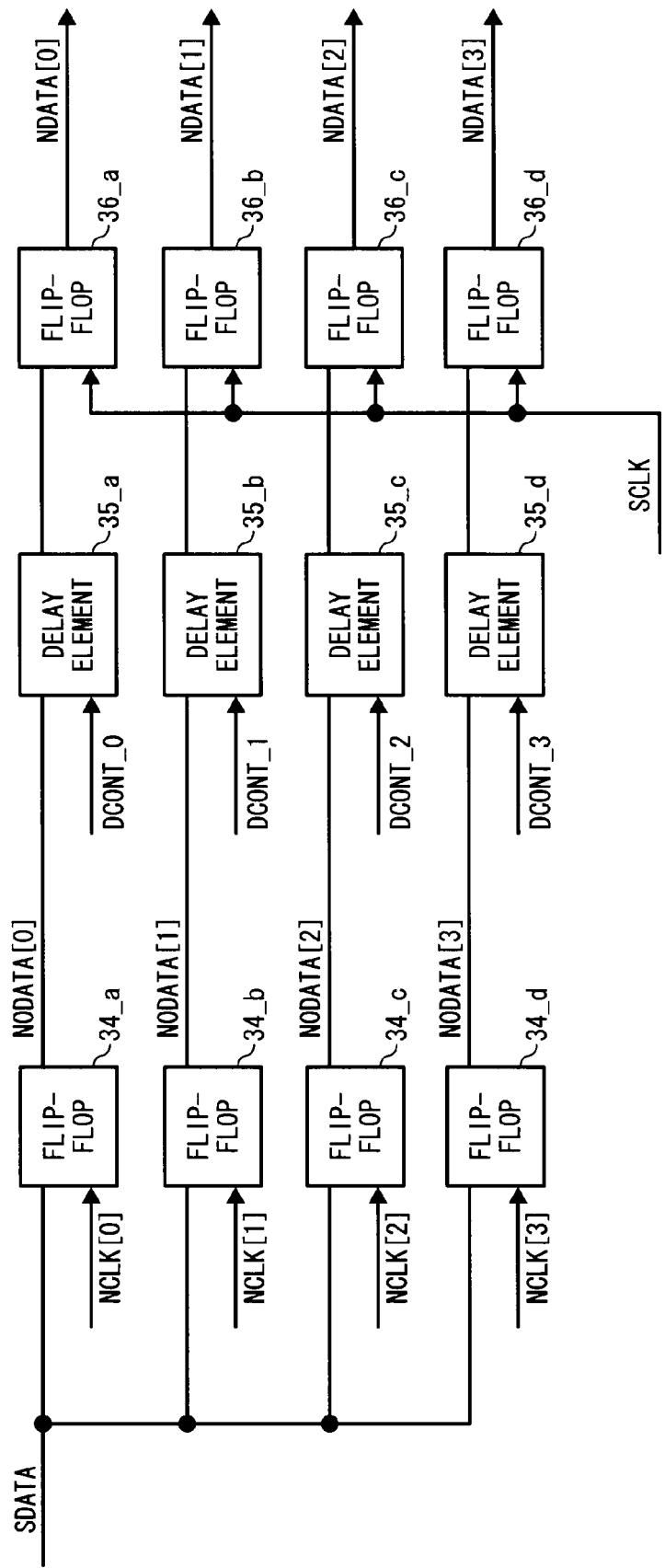
FIG. 17 depicts another embodiment of a multiphase sampling unit incorporated in the oversampling circuit according to the present invention.

FIG. 17 depicts another embodiment of the multiphase sampling unit 27 incorporated in the oversampling circuit according to the present invention.

Similar to the embodiment shown in FIG. 4, the input serial data SDATA is sampled at flip-flops 34_a to 34_d using the N bit multiphase clocks NCLK, is delayed at delay elements 35_a to 35_d, is synchronized with the sampling clock SCLK at flip-flops 36_a to 36_d, and then is put out as the N bit multiphase data NDATA.

The delay times $\tau'\_0$ to $\tau'\_(N-1)$ of the delay elements 35_a to 35_d are controlled by the delay control signals DCONT_0 to DCONT_(N−1), respectively. Similar to the first embodiment of the present invention, the total delay time $\tau tok\_k$, that is, the sum of the delay time $\tau\_k$, which is given by the multiphase delay control unit 26, and the delay time $\tau'\_k$ should desirably be constant with respect to the value of k.

The dispersion of the total delay time $\tau tot\_k$ to some extent, however, raises no problem if the set-up and hold time of the flip-flops 36_a to 36_d is within an allowable range.

Figure 18:
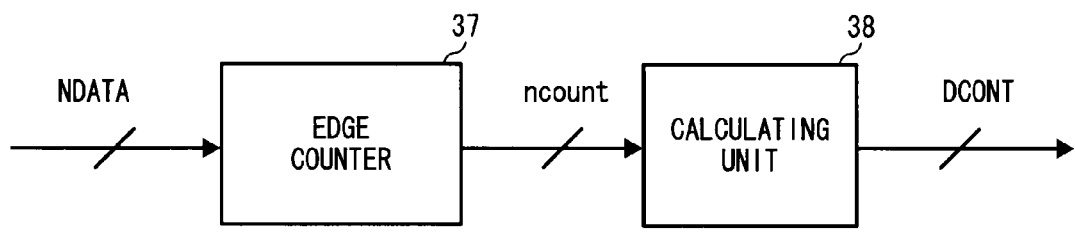
FIG. 18 depicts one embodiment of a phase detecting unit incorporated in the oversampling circuit shown in FIG. 14.

FIG. 18 depicts one embodiment of the phase detecting unit 28 incorporated in the oversampling circuit shown in FIG. 14.

An edge counter 37 counts edges for each bit of the input N bit over sample data NDATA, and puts out a count result as a count value ncount. A calculating unit 38 puts out the delay control signal DCOUNT on the basis of the count value ncount.

Figure 19:
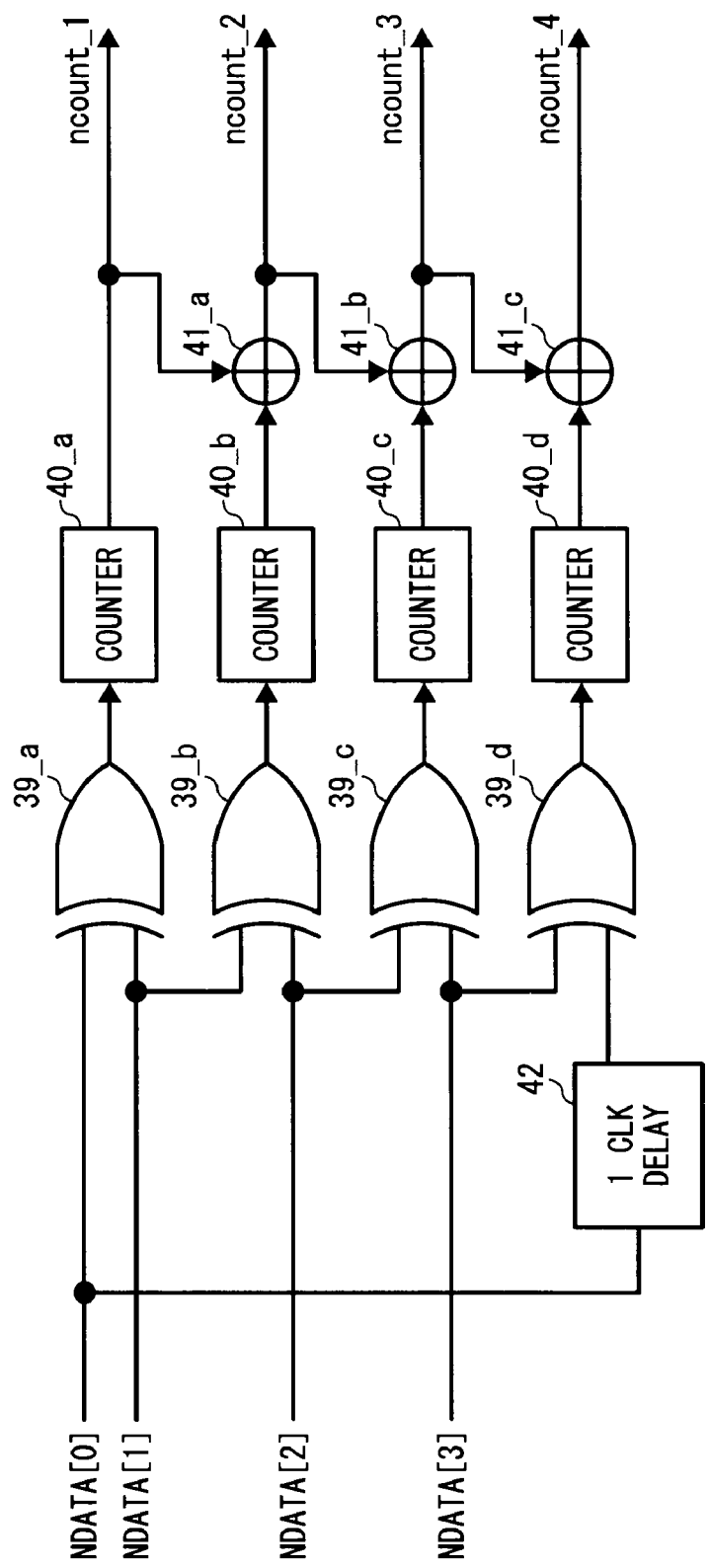
FIG. 19 depicts one embodiment of an edge counter incorporated in the phase detecting unit shown in FIG. 18.

FIG. 19 depicts one embodiment of the edge counter 37 incorporated in the phase detecting unit shown in FIG. 18.

Similar to the embodiment shown in FIG. 7, edges of the N bit multiphase data NDATA are detected for adjacent bits at XOR gates 39_a to 39_d, and the detected edges are counted at counters 40_a to 40_c. The data NDATA[0] is delayed by one cycle and is compared with the data NDATA[N−1], and the resulted number of edges is counted at the counter 40_d. Output from each of the counters 40_a to 40_d is put into each of adders 41_a to 41_c, which calculates the sum of each output from the counters.

In this manner, the total numbers of edges before respective bits of the N bit multiphase data MDATA are counted, and are put out as count values ncount_1 to count_N.

Figure 20:
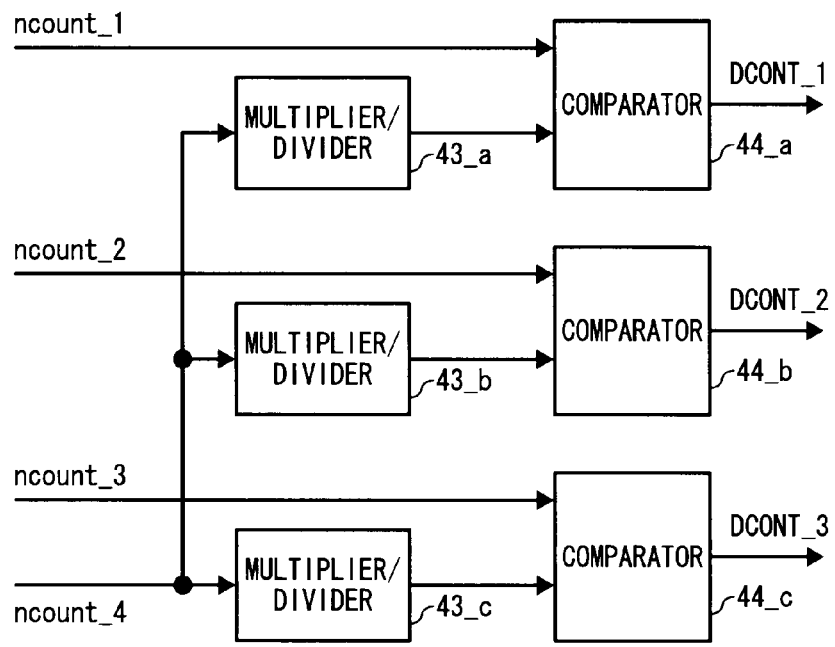
FIG. 20 depicts one embodiment of a calculating unit incorporated in the phase detecting unit shown in FIG. 18.

FIG. 20 depicts one embodiment of the calculating unit 38 incorporated in the phase detecting unit shown in FIG. 18.

Multipliers/dividers 43_a to 43_c multiply the count value ncount_N by a/N (a=1, 2, ... N−1), respectively, and put calculation results into comparators 44_a to 44_c. The comparators 44_a to 44_c compare the calculation results from the multipliers/dividers 43_a to 43_c with the count value ncount_k, respectively, and put out the delay control signal DCOUNT for each of the N bit multiphase clocks NCLK on the basis of the result of comparison.

As described in the first embodiment of the present invention, the count value ncount_k represents a time difference between the N bit clock NCLK_k and the N bit clock NCLK_0 when the edges of the input signal SDATA is distributed uniformly relative to the referenced clock REFCLK. For this reason, when the delay control signal DCONT is given a proper value so that each value taken by ncount k is equivalent to 1/N of the count value ncount_N, the N bit multiphase clocks NCLK have phases each equivalent to 1/N of T.

As described above, a delay time at the multiphase delay unit 1 changes dynamically due to the fluctuation of power voltage and temperature. For this reason, the above control through phase detection is carried out constantly or at every a given time interval, or carried out properly when the monitored fluctuation of power voltage and temperature reaches a certain amount. In this way, a clock at a desired phase can be selected constantly.

Which way to use to carry out detection can be selected properly according to effectiveness in practical use. As described above, when the count value ncount_k represents a time difference between N bit multiphase clocks, the edges of the input data SDATA must be distributed uniformly at the given probability density φ relative to the clock NCLK[0]. To meet this condition, edge counting must be carried out for the given time T0 or longer.

Figure 21:
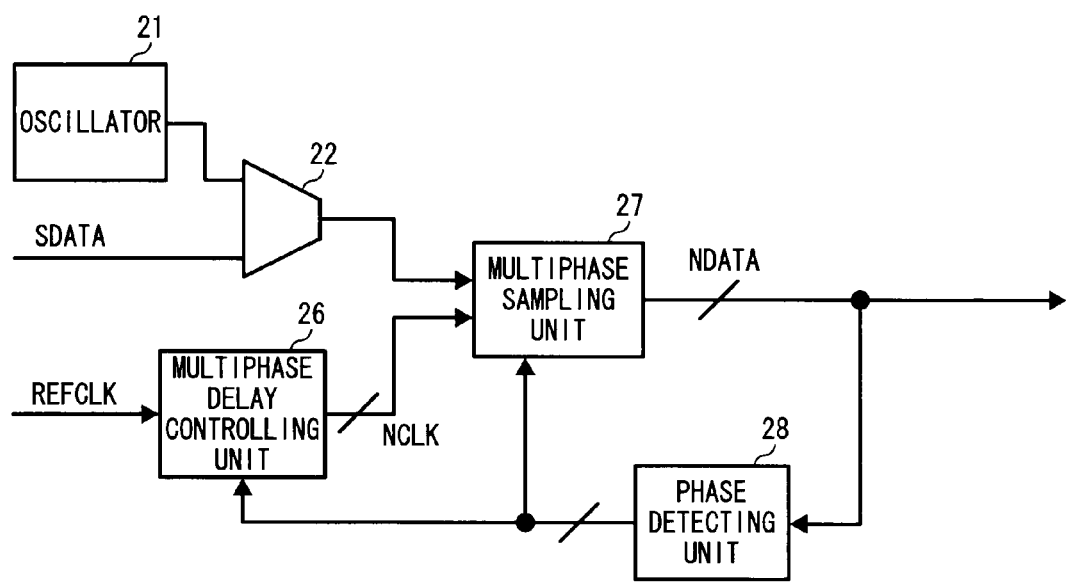
FIG. 21 depicts another embodiment of a receiver using the oversampling circuit shown in FIG. 14.

When the clock frequency of the input data SDATA is Ftx, the frequency of the reference clock REFCLK is Frx, and both frequencies are approximately the same, the time T0 must satisfies the condition: T0>1/|Ftx−Frx|. When the transmission side and the reception side are not completely asynchronous with each other for such a reason as operation at the same reference clock, a receiver having a configuration shown in FIG. 21 is used preferably.

Figure 22:
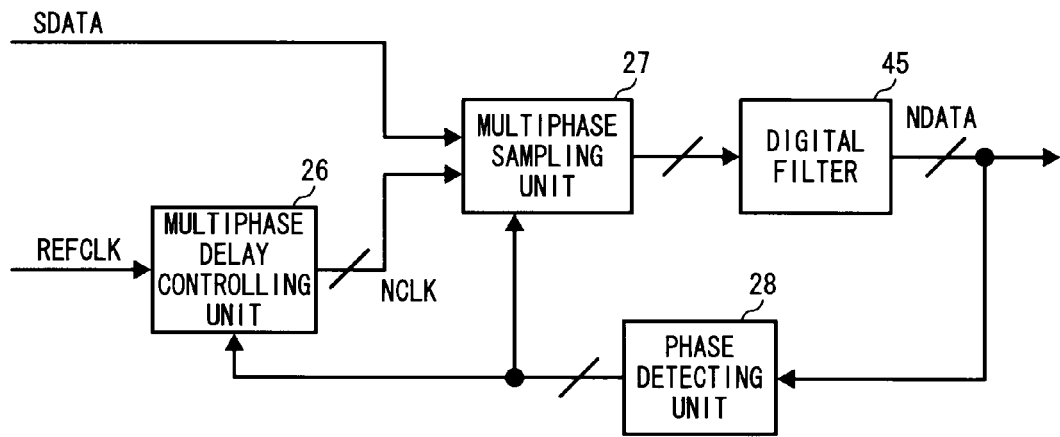
FIG. 22 depicts another embodiment of a receiver using the oversampling circuit according to the present invention.

This receiver is provided by connecting the oscillator 21 and the selector 22 to the oversampling circuit of the embodiment shown in FIG. 14. The detailed operation of the oscillator 21 and selector 22 is virtually the same as that of the embodiment shown in FIG. 10, and is therefore not described further in detail. If the frequency F1 of the oscillator 21 is approximately the same as the frequency Frx of the reference clock REFCLK, the counting time T0 must satisfy at least the condition: T0>1/|F1−Frx|. If the frequency F1 of the oscillator 21 is low enough to be one pth of the frequency Frx, the counting time T0 must satisfy the condition: T0>p/|F1−Frx|. In dealing with the above problem of phase reversal in the multiphase clocks NCLK, a receiver having a configuration shown FIG. 22 is used preferably. This receiver is provided by adding a digital filter 45 having proper low-pass characteristics to the oversampling circuit of the embodiment shown in FIG. 14.

The operation of the digital filter 45 is the same as that of the digital filter of the first embodiment, and is therefore not described further in detail.

As describe above, according to the second embodiment, data is taken in using multiphase clocks generated on the basis of one reference clock, the edges of the data pattern are counted to estimate the phase relation of the multiphase clocks, and control is performed to make the phases of the multiphase clocks proper one. Through this process, the dispersion of clock phases due to power/temperature fluctuation, functional dispersion of devices, etc., is corrected to be able to carry out precise oversampling of the input data. Since sampled data is used for phase detection, a detection error can be reduced. The reference clock used for the circuit is acceptable if it has a single phase, and the multiphase clocks are used for sampling immediately after being generated. This eliminates a need of transmitting the multiphase clocks, allowing a smaller circuit scale, thus leading to a reduction in chip size and power consumption.

Figure 23:
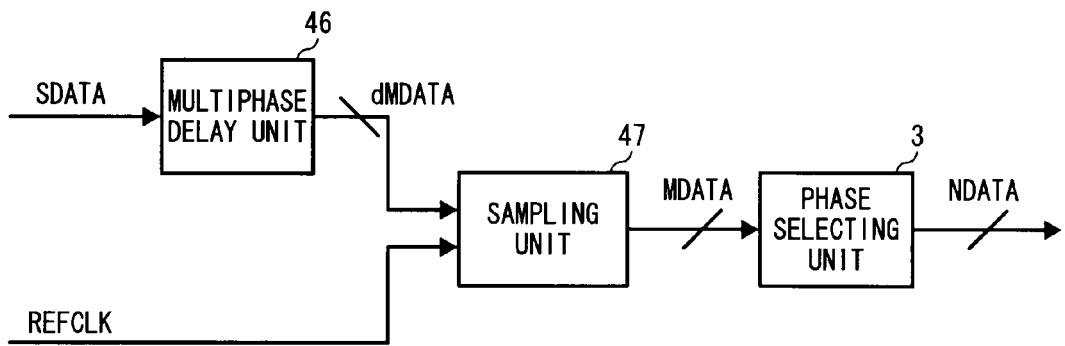
FIG. 23 depicts the overall configuration of an oversampling circuit according a third embodiment of the present invention.

FIG. 23 depicts the overall configuration of an oversampling circuit according to a third embodiment of the present invention.

In the oversampling circuit shown in FIG. 23, the serial data SDATA is put into a multiphase delay unit 46, and is put out as M bit multiphase delay data DMDATA having phases different from each other. The M bit multiphase delay data DMDATA is sampled using the reference clock REFCLK at a sampling unit 47, and is put out as the M bit multiphase data MDATA. The reference clock REFCLK is acceptable when generated by an ordinary PLL circuit, etc., which is a known technique, and is therefore not described in detail. The phase selecting unit 3 selects a proper data out of the multiphase data MDATA, and puts out the selected data as the N bit over sample data NDATA. In this process, M>N must be satisfied.

The multiphase delay unit 46 is provided by using the multiphase delay unit having the same configuration as shown in FIG. 3. However, the multiphase delay unit 46 receives input of the serial data SDATA, and puts out the M bit multiphase delay data DMDATA.

The multiphase delay unit 46 is different from the multiphase delay unit of the first embodiment in the point that a delay time given for the delay data DMDATA[0] is the maximum and a delay time given for the delay data DMDATA[M−1] is the minimum.

Figure 24:
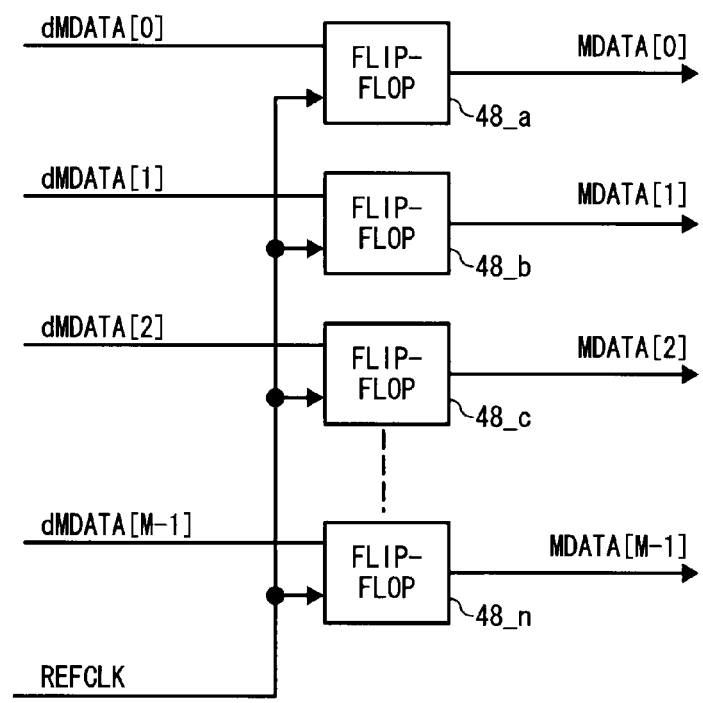
FIG. 24 depicts one embodiment of a sampling unit incorporated in the oversampling circuit shown in FIG. 23.

FIG. 24 depicts one embodiment of the sampling unit 47 incorporated in the oversampling circuit shown in FIG. 23, in which embodiment M=14 is satisfied.

M units of flip-flops 48_*a* to 48_*n* take in all M bit multiphase delay data DMDATA using the reference clock REFCLK. This embodiment is different from the first embodiment in the point that the data itself is delayed already, so that a single clock can be used as a clock for sampling the data. The data taken in, therefore, can be put out directly as synchronized data.

Figure 25:
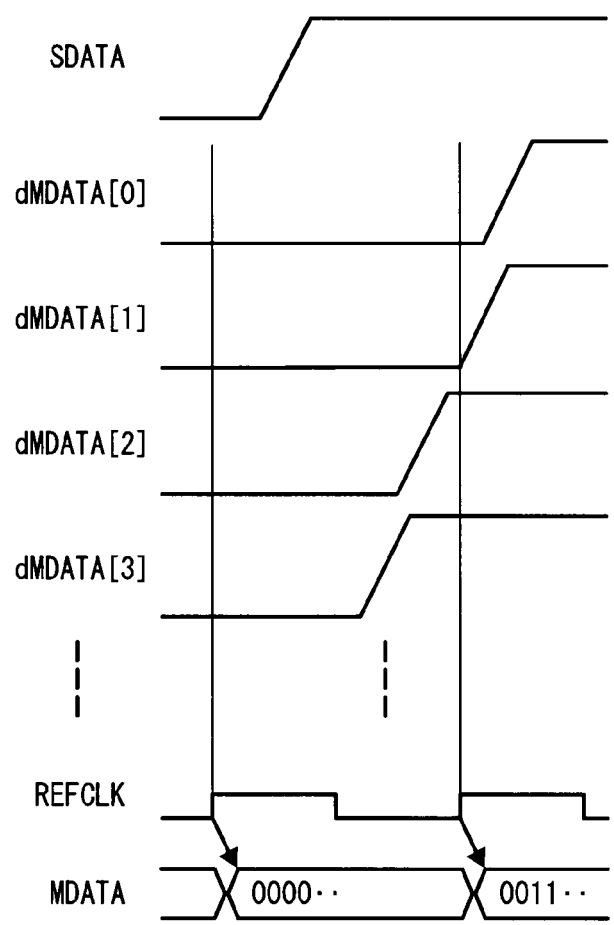
FIG. 25 depicts an example of a timing chart of a multiphase delay unit and the sampling unit that are incorporated in the oversampling circuit shown in FIG. 23.

FIG. 25 depicts an example of a timing chart of the multiphase delay unit 46 and the sampling unit 47 that are incorporated in the oversampling circuit shown in FIG. 23.

As described above, the external input serial data SDATA is delayed at the multiphase delay unit 46, and is put out of the multiphase delay unit 46 as the M bit multiphase delay data DMDATA, which is then sampled at the sampling unit 47.

The M bit multiphase data MDATA obtained through this process is the result of oversampling of the serial data SDATA. The constituent elements used in the following process, therefore, can be provided as the same constituent elements as that of the first embodiment.

The phase selecting unit 3 is the same as that of the first embodiment, and is therefore not described further in detail. Since a delay time at the multiphase delay unit 46 changes dynamically, as described above, selection operation at the phase selecting unit 3 is carried out constantly or on a necessary basis. This condition is also the same as one mentioned before, and is therefore not described further in detail.

Figure 26:
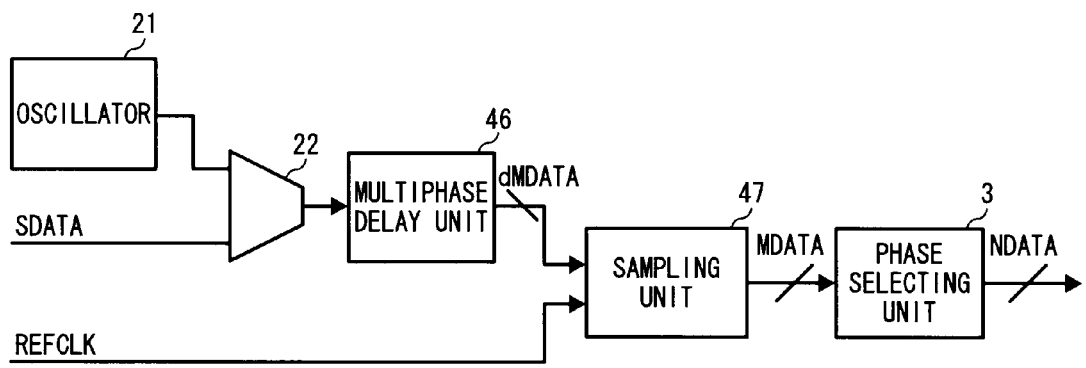
FIG. 26 depicts a receiver constructed by adding an oscillator and a selector to the oversampling circuit shown in FIG. 23.
Figure 27:
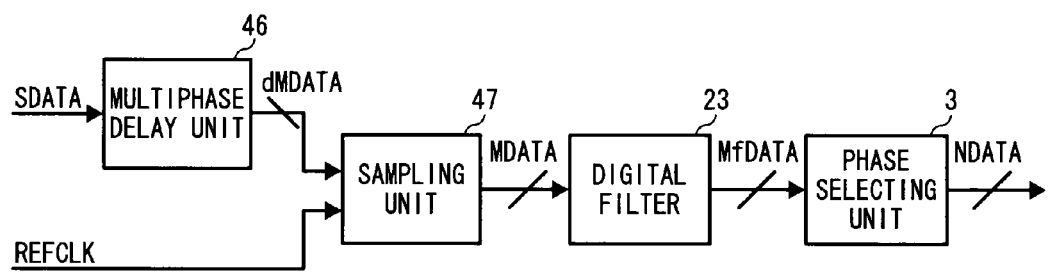
FIG. 27 depicts a receiver constructed by adding a digital filter to the receiver shown in FIG. 26.

FIG. 26 depicts a receiver constructed by adding the oscillator 21 and the selector 22 to the oversampling circuit shown in FIG. 23 for calibration operation. This receiver is not described further in detail. Phase reversal may happen in the multiphase delay unit 46, and a receiver having an additional component of the digital filter 23 as shown in FIG. 27 may be used to deal with the phase reversal problem. This receiver has the same configuration as the configurative example shown in FIG. 11, and is therefore not described further in detail.

As described above, according to the third embodiment, multiphase delay data generated by delaying input serial data is taken in using a single clock, the edges of the data pattern are counted to estimate the phase relation of the multiphase delay data, and data that is properly delayed and sampled is put out as oversampling data. Through this process, the dispersion of clock phases due to power/temperature fluctuation, functional dispersion of devices, etc., is corrected to be able to carry out precise oversampling of the input data. Since sampled data is used for phase detection, a detection error can be reduced. The data is delayed and turned into multiphase data, so that a single clock suffices for sampling and phase alignment following sampling is not necessary. This allows a smaller circuit scale, leading to a reduction in chip size and power consumption.

Figure 28:
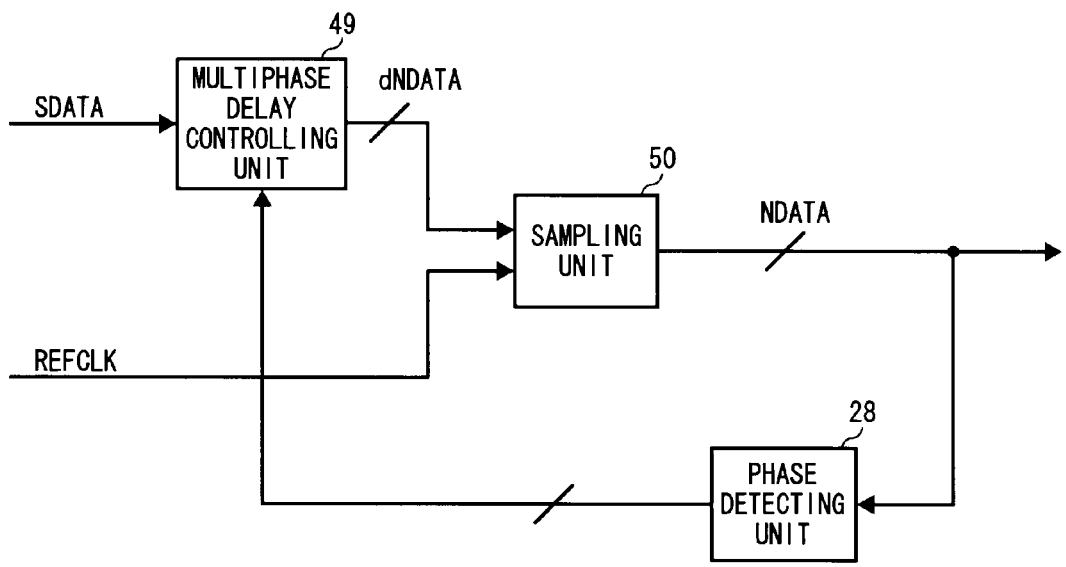
FIG. 28 depicts the overall configuration of an oversampling circuit according a fourth embodiment of the present invention.

FIG. 28 depicts the overall configuration of an oversampling circuit according to a fourth embodiment of the present invention.

A multiphase delay control unit 49 delays the input serial data SDATA, and put it out as N bit multiphase delay data dNDATA. In delaying the serial data SDATA, a delay time for each phase is controlled by each of delay control signals DCONT_0 to DCONT_(N-1). The N bit multiphase delay data dNDATA is sampled using the reference clock REFCLK at a sampling unit 50, and is put out as the N bit over sample data NDATA. The phase detecting unit 28 detects the phases of the multiphase clocks NCLK on the basis of the over sample data NDATA, and puts out proper delay control signals DCONT_0 to DCONT_(N-1). The multiphase delay control unit 49 is provided as the multiphase delay control unit having the configuration shown in FIG. 15. The multiphase delay control unit 49, however, receives input of the serial data SDATA and puts out the N bit multiphase delay data dNDATA.

The multiphase delay control unit 49 is different from the multiphase delay control unit of the second embodiment in the point that a delay time given for the delay data dNDATA[0] is the maximum and a delay time given for the delay data dNDATA[N-1] is the minimum. The sampling unit is so configured as to put the incoming multiphase delay data dNDATA into flip-flops to sample the data using the reference clock REFCLK. This configuration is virtually the same as the configuration shown in FIG. 24, and is therefore not described further in detail.

Figure 29:
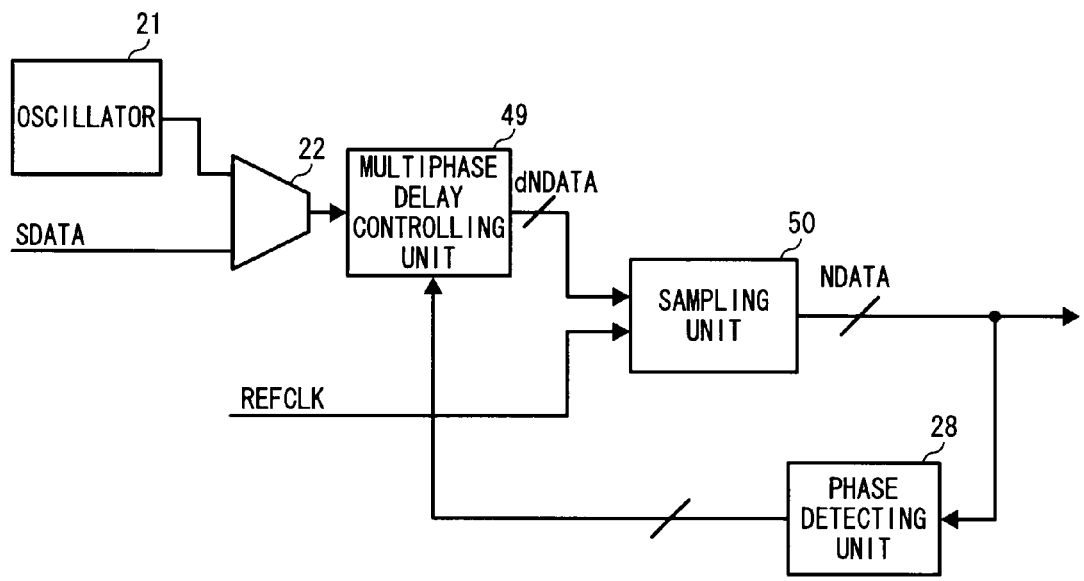
FIG. 29 depicts a receiver constructed by adding the oscillator and the selector to the oversampling circuit according to the present invention.
Figure 30:
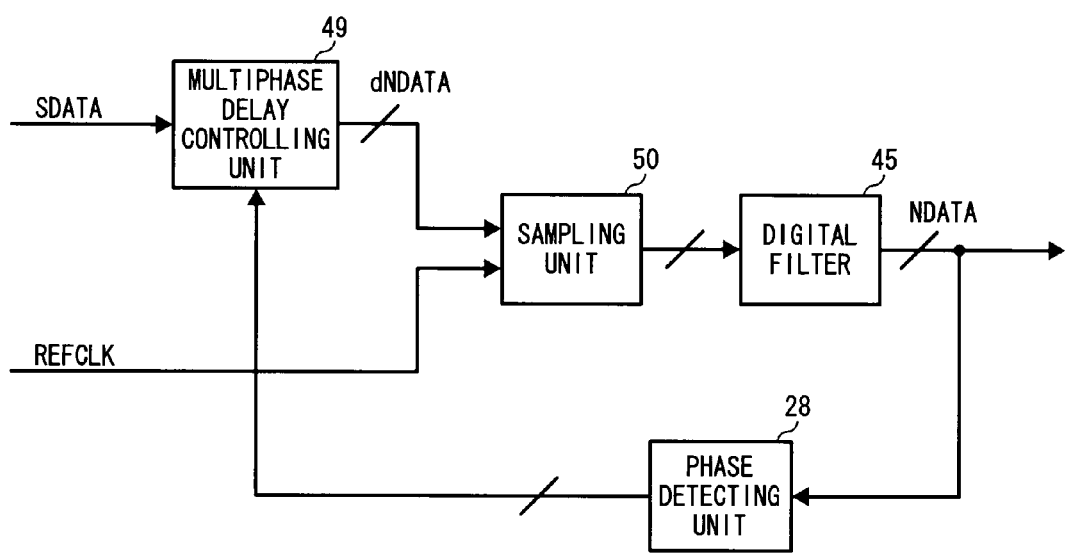
FIG. 30 depicts a receiver constructed by adding a digital filter to the receiver shown in FIG. 29.
Figure 31:
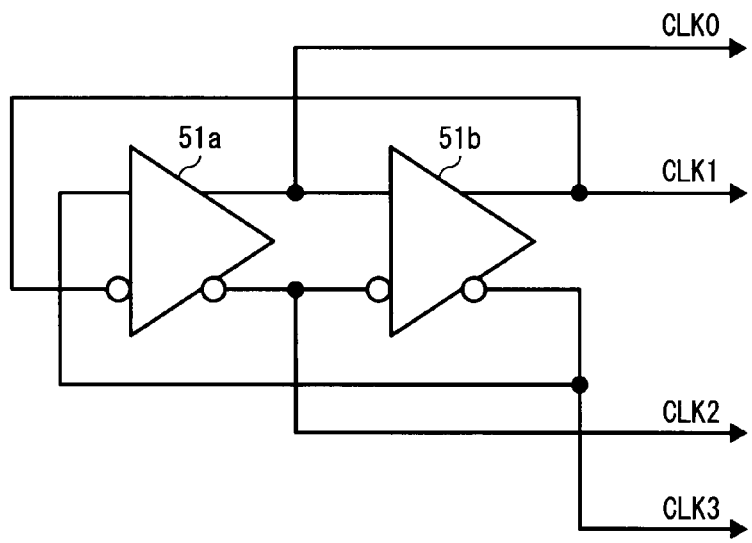
FIG. 31 depicts a conventional example of a multiphase clock circuit.
Figure 32A:
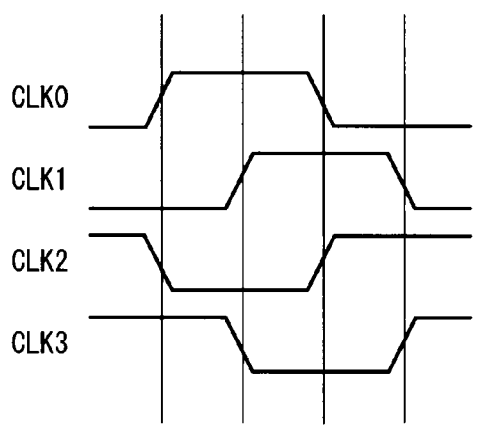
FIGS. 32A and 32B are timing charts of the multiphase clock circuit shown in FIG. 31.
Figure 32B:
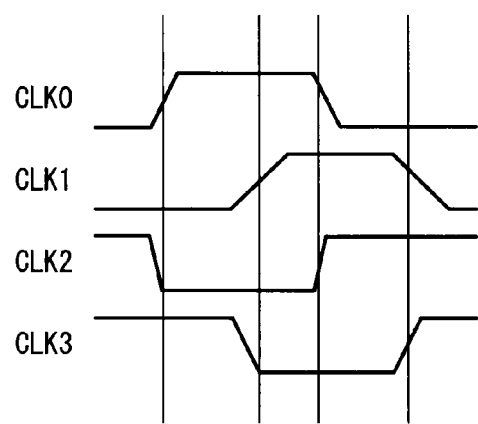

The phase detecting unit 28 is the same as that of the second embodiment, and is therefore not described further in detail. Since a delay time at the multiphase delay unit 46 changes dynamically, as described above, selection operation at the phase detecting unit 28 is carried out constantly or on a necessary basis. This condition is also the same as one mentioned before, and is therefore not described further in detail. FIG. 29 depicts a receiver provided with additional components of the oscillator 21 and the selector 22 for calibration operation. This receiver is not described further in detail. Phase reversal may happen in the multiphase delay control unit 49, and a receiver having an additional component of the digital filter 45 as shown in FIG. 30 may be used to deal with the phase reversal problem. This receiver has the same configuration as the configurative example shown in FIG. 11, and is therefore not described further in detail.

As described above, according to the fourth embodiment, multiphase delay data generated by delaying input serial data is taken in using a single clock, the edges of the data pattern are counted to estimate the phase relation of the multiphase delay data, and control is performed to make the phases of the multiphase delay data proper one. Through this process, the dispersion of clock phases due to power/temperature fluctuation, functional dispersion of devices, etc., is corrected to be able to carry out precise oversampling of the input data. Since sampled data is used for phase detection, a detection error can be reduced. The data is delayed and turned into multiphase data, so that a single clock suffices for sampling and phase alignment following sampling is not necessary. This allows a smaller circuit scale, leading to reduction in chip size and power consumption.

According to the first embodiment, multiphase clocks are generated on the basis of a reference clock to sample external input serial data using the multiphase clocks, the phase relation of the multiphase clocks is detected from the edges of a data pattern obtained by the sampling, and data having a proper phase is selected and put out as oversampling data. This process allows the dispersion of delay times for the multiphase clocks to be generated, which enables substantial reduction in trouble with circuit layout and power supply design. The process also allows a delay circuit of a simple structure, which leads to reduction in circuit scale, chip size, and power consumption. In addition, phase detection is carried out using sampled digital data, which enables highly precise phase detection.

Furthermore, according to the second embodiment, multiphase clocks are generated on the basis of a reference clock to sample external input serial data using the multiphase clocks, the phase relation of the multiphase clocks is detected from the edges of a data pattern obtained by the sampling, and delay times given upon generating the multiphase clocks are controlled for respective phases. This process allows the functional dispersion of delay circuits generating the multiphase clocks, which enables substantial reduction in trouble with circuit layout and power supply arrangement. The process also allows the delay circuit of a simple structure, which leads to a reduction in circuit scale, chip size, and power consumption. In addition, phase detection is carried out using sampled digital data, which enables highly precise phase detection. The number of clocks for phase detection can be reduced to the minimum necessary number, which enables further reduction in circuit scale.

Moreover, according to the third embodiment, multiphase data is generated on the basis of external input serial data to sample the multiphase data using a reference clock, the phase relation of the multiphase data is detected from the edges of a data pattern obtained by the sampling, and data having a proper phase is selected and put out as oversampling data. This process allows the dispersion of delay times for the multiphase data to be generated, which enables a substantial reduction in trouble with circuit layout and power supply design. The process also allows a delay circuit of a simple structure, which leads to a reduction in circuit scale, chip size, and power consumption. In addition, phase detection is carried out using sampled digital data, which enables highly precise phase detection. The clock used for sampling has a single phase, thus can be used directly on a digital circuit, which allows further reduction in circuit scale.

Furthermore, according to the fourth embodiment, multiphase data is generated on the basis of external input serial data to sample the multiphase data using a reference clock, the phase relation of the multiphase data is detected from the edges of a data pattern obtained by the sampling, and delay times given upon generating the multiphase data are controlled for respective phases. This process allows the dispersion of delay times for the multiphase clocks to be generated, which enables a substantial reduction in trouble with circuit layout and power supply arrangement. The process also allows a delay circuit of a simple structure, which leads to reduction in circuit scale, chip size, and power consumption. In addition, phase detection is carried out using sampled digital data, which enables highly precise phase detection.

The number of clocks for phase detection can be reduced to the minimum necessary number, which enables further reduction in circuit scale. The clock used for sampling has a single phase, thus can be used directly on a digital circuit, which enables further reduction in circuit scale. In any one of the above embodiments, provided the circuit with a proper oscillation circuit enables accurate phase detection even if the transmission side is completely synchronized with the reference clock. Also, providing the circuit with a digital filter allows detection of a clock having a correct phase even if phase reversal is happening in the multiphase clocks. The oscillator and digital filter are each provided by using a simple circuit and yet offer a sufficient effect.

The embodiments described above present an example of preferred embodiments of the present invention, and are not intended to limit the invention. Various modifications of the embodiments may be made without departing from the spirit of the present invention.

As described above, according to one aspect of the present invention, delay times for the multiphase clocks to generate are allowed to be different from each other, which remarkably reduces trouble with circuit layout and power supply design. A delay circuit is allowed to be simply configured, which leads to a reduction in circuit scale, chip size, and power consumption. Phase detection is carried out using sampled digital data, which enables highly precise phase detection. Thus, data subjected to oversampling at phases having equal intervals can be generated.

Furthermore, according to another aspect of the present invention, not every circuit is considered to be equivalent when multiphase clocks are generated, but the multiphase clocks are generated using a delay unit having respective different delay times, and data subjected to oversampling at phases having equal intervals is generated on the basis of sampling data obtained by using the multiphase clocks. In this process, phase detection is carried out using sampled digital data, so that highly precise phase detection can be carried out with a small-scale circuit. The data subjected to oversampling at phases having equal intervals, therefore, can be generated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An oversampling circuit for sampling an input signal, comprising:
    a multiphase delay control unit that causes different delay times to a reference clock to generate a multiphase clock with different phases, and includes a plurality of delay elements that delay the reference clock by different delay times, the delay time for each of the plurality of delay elements being controlled by a separate phase control signal;
    a multiphase sampling unit that samples the input signal using the multiphase clock, and outputs multiphase sampling data; and
    a phase detecting unit that detects a phase relation of the multiphase clock using the multiphase sampling data, and generates the separate phase control signals for the multiphase clock based on the detected phase relation of the multiphase clock.

2. The oversampling circuit according to claim 1, wherein the multiphase delay control unit controls the delay time for each phase by controlling a flow rate of a current.

3. The oversampling circuit according to claim 1, wherein the phase detecting unit includes a counter that counts number of data transitions of the multiphase sampling data for each phase of the multiphase clock, and detects the phase relation based on a count value of the counter.

* * * * *